United States Patent
Knight et al.

(10) Patent No.: US 7,473,488 B2
(45) Date of Patent: Jan. 6, 2009

(54) BATTERY WITH VIBRATION-RESISTANT JOINT BETWEEN POSITIVE ELECTRODE AND CURRENT CARRYING STRAP

(75) Inventors: James Roger Knight, Monmouthshire (GB); Dennis Kevill, Monmouthshire (GB); Charles Andrew Loyns, South Glamorgan (GB); Raju Kurian, Glamorgan (GB)

(73) Assignee: Enersys European Holdings Co., Reading, PA (US)

( * ) Notice: Subject to any disclaimer, the term of this patent is extended or adjusted under 35 U.S.C. 154(b) by 608 days.

(21) Appl. No.: 10/511,997

(22) PCT Filed: Apr. 15, 2003

(86) PCT No.: PCT/US03/11719

§ 371 (c)(1),
(2), (4) Date: May 18, 2005

(87) PCT Pub. No.: WO03/090292

PCT Pub. Date: Oct. 30, 2003

(65) Prior Publication Data

US 2005/0255378 A1    Nov. 17, 2005

(51) Int. Cl.
*H01M 10/00* (2006.01)
*H01M 10/16* (2006.01)
*H01M 4/02* (2006.01)
*H01M 4/56* (2006.01)
*H01M 2/28* (2006.01)

(52) U.S. Cl. ................. 429/122; 429/208; 429/211; 429/225; 429/161

(58) Field of Classification Search ............ 429/208, 429/211, 225
See application file for complete search history.

(56) References Cited

U.S. PATENT DOCUMENTS 3,802,488 A * 4/1974 Hull et al. ............ 164/270.1

(Continued)

FOREIGN PATENT DOCUMENTS

EP        0 314 318 A2    5/1989

(Continued)

OTHER PUBLICATIONS

PCT International Search Report for PCT/US03//11719.
Japanese Office Action with English translation (9 pages) corresponding to Japanese Patent Application No. 2003-586948; Facsimile dated Oct. 17, 2008.

(Continued)

*Primary Examiner*—Dah-Wei Yuan
*Assistant Examiner*—Zachary Best
(74) *Attorney, Agent, or Firm*—Myers Bigel Sibley & Sajovec

(57) ABSTRACT

A method of manufacturing a battery includes providing a cell for a battery having alternating positive and negative electrode plates, each of the electrode plates being separated by an electrically insulative separator layer. Each of the positive and negative electrode plates includes a projecting tab extending from an adjacent upper portion thereof, the projecting tabs of the positive plates being generally aligned, and the projecting tabs of the negative plates being generally aligned. The method comprises attaching a conductive connecting strap to the projecting tabs The method comprises applying a cap material onto the connecting positive strap and allowing the cap material to spread and drip to the exposed portions of the projecting tabs and the adjacent upper portions of the negative and positive plates and separator material. The cap material hardens to provide a cap.

19 Claims, 7 Drawing Sheets

U.S. PATENT DOCUMENTS

| | | |
|---|---|---|
| 3,841,915 A | 10/1974 | Eberle |
| 4,509,253 A | 4/1985 | Eberle |
| 4,607,797 A * | 8/1986 | Enikolopow et al. .......... 241/23 |

FOREIGN PATENT DOCUMENTS

| | | |
|---|---|---|
| EP | 0 734 084 A1 | 9/1996 |
| EP | 0 944 120 A2 | 9/1999 |
| JP | 57-152768 U | 9/1982 |
| JP | 63 291361 | 11/1988 |
| JP | 63-291361 | 11/1988 |
| JP | 64-36969 U | 3/1989 |
| JP | 2-24453 U | 2/1990 |
| JP | 05 013066 | 1/1993 |
| JP | 05-13066 | 1/1993 |
| JP | 07-169454 | 7/1995 |
| JP | 08-255608 | 1/1996 |
| JP | 08 222199 | 8/1996 |
| JP | 10144269 A * | 5/1998 |
| JP | 2001-273883 A | 5/2001 |
| JP | 2001 185206 | 7/2001 |

* cited by examiner

BATTERY WITH VIBRATION-RESISTANT JOINT BETWEEN POSITIVE ELECTRODE AND CURRENT CARRYING STRAP

FIELD OF THE INVENTION

The invention relates generally to batteries, and more particularly to lead-acid batteries.

BACKGROUND OF THE INVENTION

A typical battery includes one or more electrochemical cells which are electrically connected within the battery and provide the source of electrical power for the battery. These cells generally comprise four basic components: a positive electrode (anode on charge and cathode on discharge) that receives electrons from an external circuit as the cell is discharged; a negative electrode (cathode on charge and anode on discharge) that donates electrons to the external circuit as the cell is discharged; an electrolyte (often in a solution or paste) which provides a mechanism for electrical charge to flow between the positive and negative electrodes; and one or more separators which electrically isolate the positive and negative electrodes. This configuration enables the cell to generate electric power because of the electrochemical relationship of these components. Once the current is generated, it is typically carried from the positive electrode plates through a current carrier to a terminal, from which it is conveyed to the external circuit and back into the battery through a terminal connected with the negative electrode plates (typically through another current carrier).

Lead-acid batteries are popular when rechargeability is desired. These batteries are particularly desirable for rechargeable use due to their high tolerance for abuse and relatively low manufacturing cost, particularly when battery weight is not a great concern. As a result, lead-acid batteries are often employed to power automobiles and other vehicles, as these environments can be quite harsh and present varied forms of maltreatment. Lead acid batteries are also often used in backup systems that provide power when an electrical power grid fails.

Most lead-acid batteries generally rely on the same fundamental electrochemical reaction to produce power and typically employ the same active materials. The electrochemical reaction is shown below:

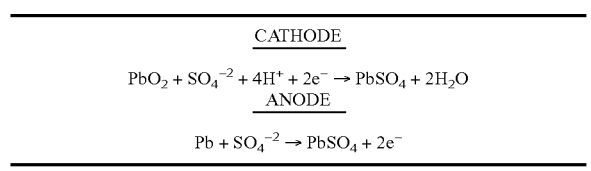

CATHODE $$PbO_2 + SO_4^{-2} + 4H^+ + 2e^- \rightarrow PbSO_4 + 2H_2O$$

ANODE $$Pb + SO_4^{-2} \rightarrow PbSO_4 + 2e^-$$

At the anode, metallic lead reacts with sulfate ion ($SO_4^{2-}$) and is converted to lead sulfate ($PbSO_4$). At the cathode, lead dioxide ($PbO_2$) reacts with sulfate ion ($SO_4^{2-}$) and is also converted to lead sulfate. Electrons are donated by the anode and travel through the external circuit to be received by the cathode.

In practice, a typical lead-acid battery includes multiple overlying anode and cathode layers. Most often, these are arranged in one of two configurations: stacked plates or spirally wound elongate strips. In either instance, the anode and cathode layers are separated from each other by separator layers formed of an electrically-insulative material (typically a glass fiber mat or the like). A dilute sulfuric acid solution is typically used as the electrolyte to provide the sulfate ion.

The stacked plate variety of lead-acid battery ordinarily includes multiple anode and cathode plates alternately sequenced in a stack separated by separator layers. In other words, the typical arrangement comprises a cathode plate, a separator layer, an anode plate, another separator layer, a second cathode plate, and so on. Some lead-acid battery cells include as many as 29 cathode and anode plates stacked in this fashion.

To harness the energy created by the electrochemical reactions occurring with the plates, the cathode plates are connected to each other in parallel, and the anode plates are separately connected to each other in parallel. One common technique for connecting the plates is to include a projecting tab from one edge of each plate. The tabs are located in the same position on each cathode plate so that they align when the plates are stacked. The tabs are attached to a conductive connecting strap that is, in turn, connected to the battery terminal. Similar aligned tabs project from the anode plates and are connected by a connecting strap, but the tabs are located in a different position on the anode plates so as to avoid interfering with the cathode strap. One example of this configuration is described in U.S. Pat. No. 4,383,011 to McClelland et al.

One difficulty that can be experienced by lead-acid batteries having this design regards the vibration resistance and durability of the batteries. As discussed above, because lead-acid batteries are typically hardy, they are often used in harsh environments. As such, they are subjected to rigorous testing, particularly for shock, bump, impact and vibration resistance (for an exemplary test, see VG96924-2, BS6290 part 4, IEC). In some instances, fractures occur at the joints between the tabs of the positive electrode plates and the connecting strap. This area of the positive electrode plate can become brittle due to oxidation (i.e. the formation of $PbO_2$) that takes place on the surface of the tabs to protect the underlying bulk metallic lead (Pb). The $PbO_2$ layer is relatively brittle, and can crack under the shearing loads imparted during vibration tests. These cracks then expose the bulk metallic lead underneath, which then oxidizes. This pattern of oxidation followed by cracking repeats until the tabs fracture completely from the plate.

SUMMARY OF THE INVENTION

The invention is directed to cells and batteries and methods of their manufacture that can assist fracture resistance at the joint between the positive electrode plate tabs and the connecting strap during vibration and other rigorous mechanical tests. As a first aspect of the invention, a method of manufacturing a battery comprises as an initial step providing a cell for a battery having alternating positive and negative electrode plates, wherein each of the electrode plates is separated by an electrically insulative separator layer, and the positive and negative electrode plates are in overlying relationship. Each of the positive electrode plates includes a projecting tab extending from an adjacent upper portion thereof, the projecting tabs of the positive plates being generally aligned. Each of the negative electrode plates includes a projecting tab, the projecting tabs of the negative plates being generally aligned. Next, the method comprises attaching a conductive connecting strap to the projecting tabs of the positive plates. The method then comprises applying a cap material to portions of the projecting tabs and the adjacent upper portions of the positive plates (such as through pouring an adhesive material onto the positive connecting strap and allowing it to spread and drip to the tabs and upper portions of the positive and typically, negative electrode plates as well as the separators), and allowing the cap material to harden to provide a cap attached to the projecting tabs and the adjacent upper portions of the positive and negative plates. This method can produce a cell in which the joints between the positive electrode plate tabs and the connecting strap are rigidified and/or protected from oxidation, each of which can improve performance in mechanical testing.

As a second aspect, the invention is directed to a battery comprising: a housing; a plurality of alternating positive and negative electrode plates; two conductive connecting straps; and a cap. Each of the positive and negative electrode plates is separated by an electrically insulative separator layer, with the positive and negative electrode plates being in overlying relationship and positioned in the housing. Each of the positive electrode plates includes a projecting tab extending from an adjacent upper portion thereof, the projecting tabs of the positive plates being generally aligned, and each of the negative electrode plates includes a projecting tab, the projecting tabs of the negative plates being generally aligned. One conductive connecting strap is attached to the projecting tabs of the positive plates, and the other conductive connecting strap is attached to the projecting tabs of the negative plates. The cap (by way of example, formed of an adhesive material) covers portions of the projecting tabs and the adjacent upper portions of the positive (and, typically, negative electrode plates as well as the separators)

DETAILED DESCRIPTION OF THE INVENTION

Figure 1A:
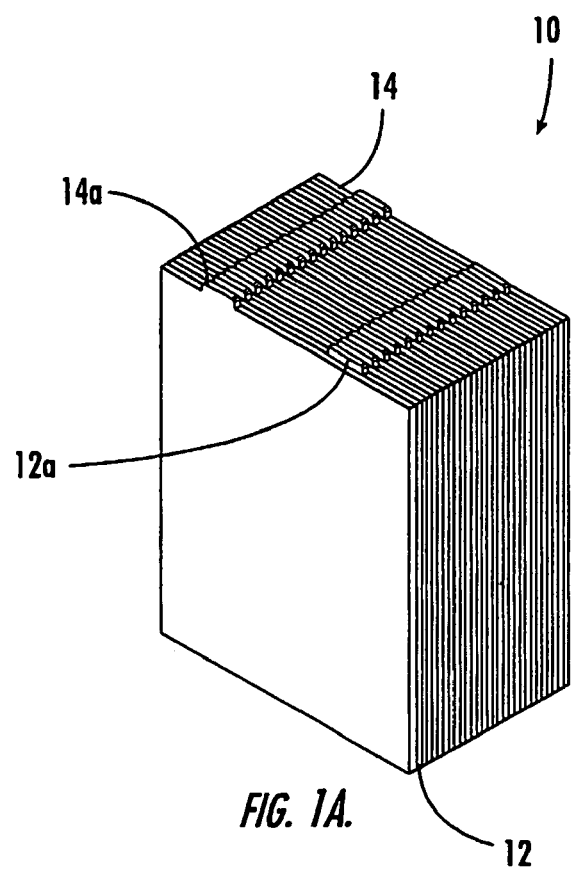
FIG. 1A is a perspective view of a stack of positive and negative plates and separators of a battery cell of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The directional terms "upwardly", "downwardly", "vertical", "horizontal" and the like are used herein for the purpose of explanation only.

Figure 1B:
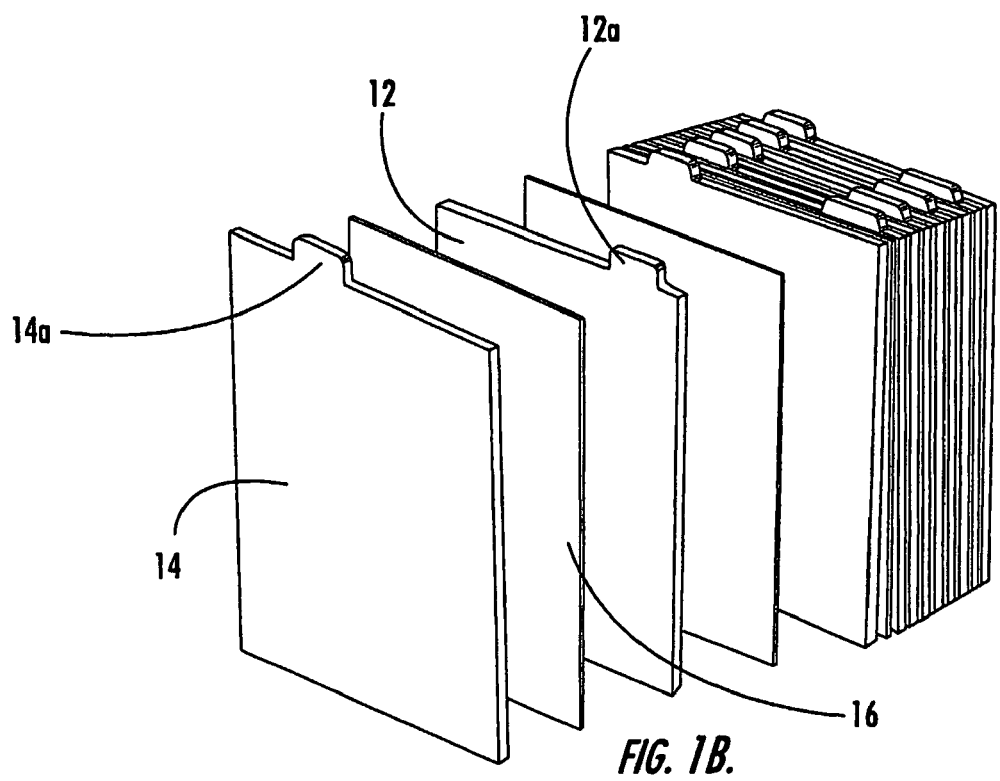
FIG. 1B is an exploded perspective view of the battery cell of FIG. 1A.

Referring now to the drawings, a battery cell, designated broadly at 10, is illustrated in FIGS. 1A and 1B. The cell 10 includes a plurality of substantially planar positive electrode plates 12 and a plurality of substantially planar negative electrode plates 14 arranged in alternating, stacked, overlying fashion, with each adjacent pair of positive and negative electrode plates being separated by a separator 16. The positive and negative electrode plates 12, 14 and the separators 16 can be any material known by those skilled in this art to be suitable for use in a cell or battery. In lead-acid cells, the positive and negative electrode plates 12, 14 are formed of lead-based materials (as used herein, "lead-based" materials comprise at least 99% percent lead). The separators 16 are typically formed of glass microfibre or synthetic loaded glass microfibre. Sizes and thicknesses of the positive and negative electrode plates 12, 14 and separators 16 are known to those skilled in this art and need not be described in detail herein.

Referring still to FIG. 1, each of the positive electrode plates 12 includes a projecting tab 12a that extends upwardly from the upper edge of the positive electrode plate 12. The tab 12a extends from substantially the same location on each positive electrode plate 12 to enable the tabs 12a to be generally aligned when the positive electrode plates 12 are stacked. The tab 12a facilitates electrical connection of all of the positive electrode plates 12 in parallel. Similarly, each of the negative electrode plates 14 includes a projecting tab 14a that extends upwardly from the upper edge of the negative electrode plate 14 and tht due to the tabs 14a being positioned at substantially the same location on each plate 14 and generally aligned, facilitates electrical connection of the negative electrode plates 14 in parallel. The precise configuration of the tabs 12a, 14a can vary, but the selected configuration should extend sufficiently from the edge of the respective electrode plate to enable electrical connection thereof.

Figures 2A, 2B:
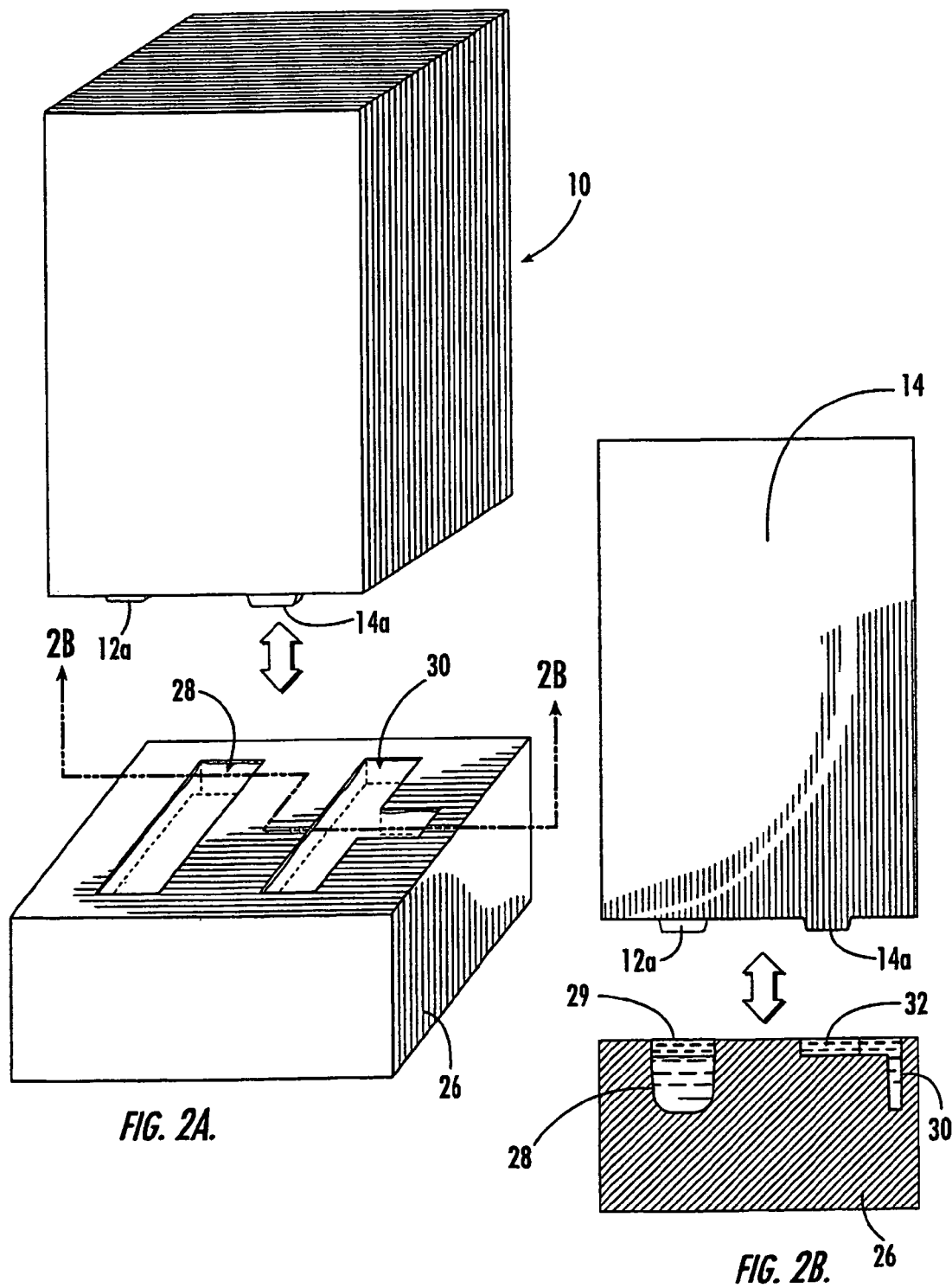
FIG. 2A is a schematic perspective view of the cell of FIG. 1A being dipped into molten material for the formation of connecting straps according to embodiments of the invention.
FIG. 2B is a section view of the cell of FIG. 2A taken along line 2B-2B thereof.

Interconnection of the positive electrode plates 12 and the negative electrode plates 14 is illustratively and typically accomplished through the application of a positive connecting strap 18 to the tabs 12a and a negative connecting strap 22 to the tabs 14a (see FIGS. 3-6). The straps 18, 22 can be applied, for example, by inverting the cell 10 and dipping the tabs 12a, 14a into wells 28, 30 of a mold 26 as the wells 28, 30 contain a molten material 29, 32 such as lead (see FIGS. 2A and 2B). The tabs 12a, 14a remain in the wells 28, 30 until the molten material 29, 32 freezes. The cell 10 with the attached straps 18, 22 is then lifted from the mold 26. Those skilled in this art will recognize that other techniques for attaching connecting straps 18, 22 to the tabs 12a, 14a, respectively, such as hand burning or any other mechanical jointing method, may also be employed with the invention.

Figure 3:
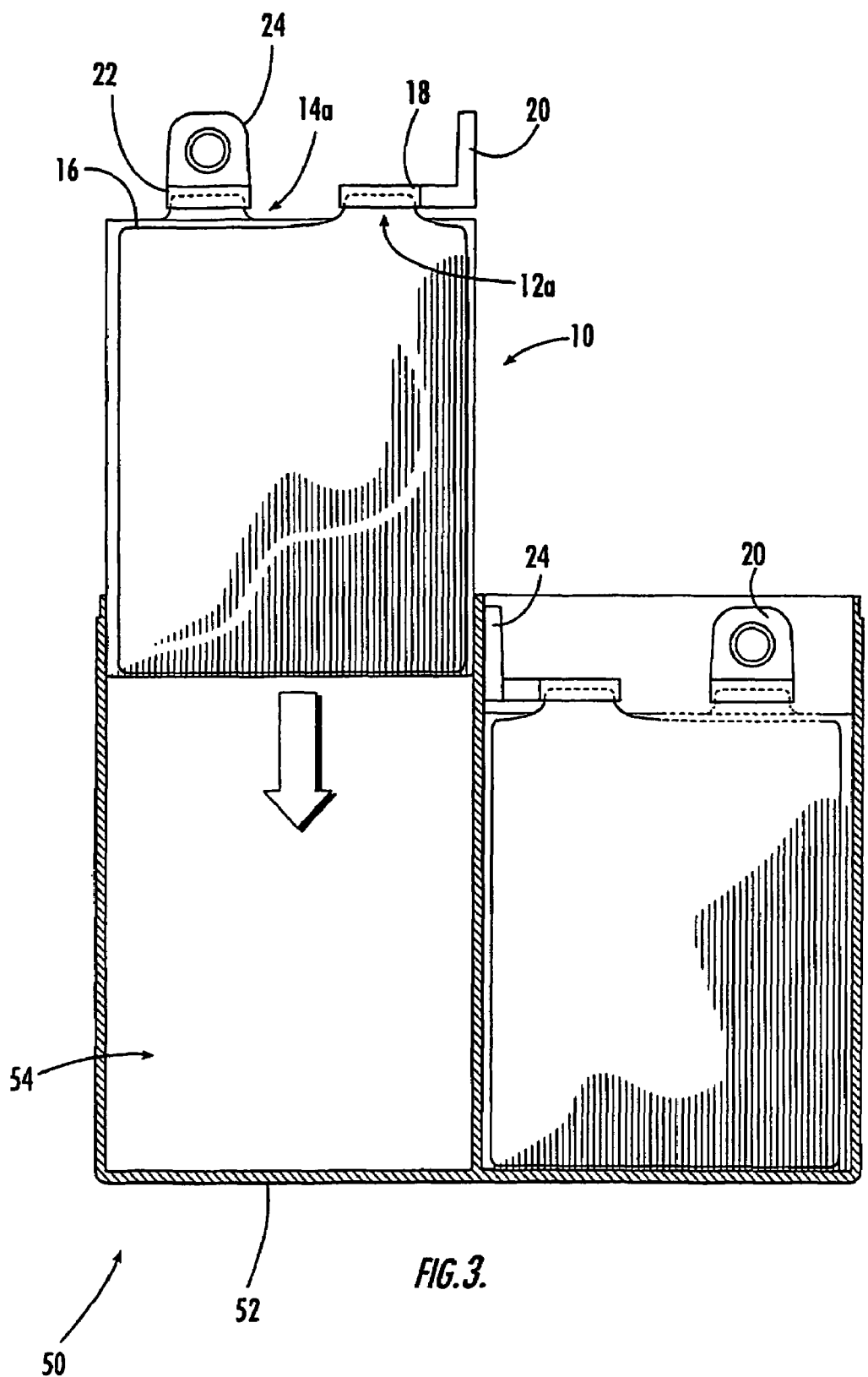
FIG. 3 is a schematic side view showing the insertion of a cell of FIGS. 2A and 2B into a battery housing according to embodiments of the invention.
Figure 4:
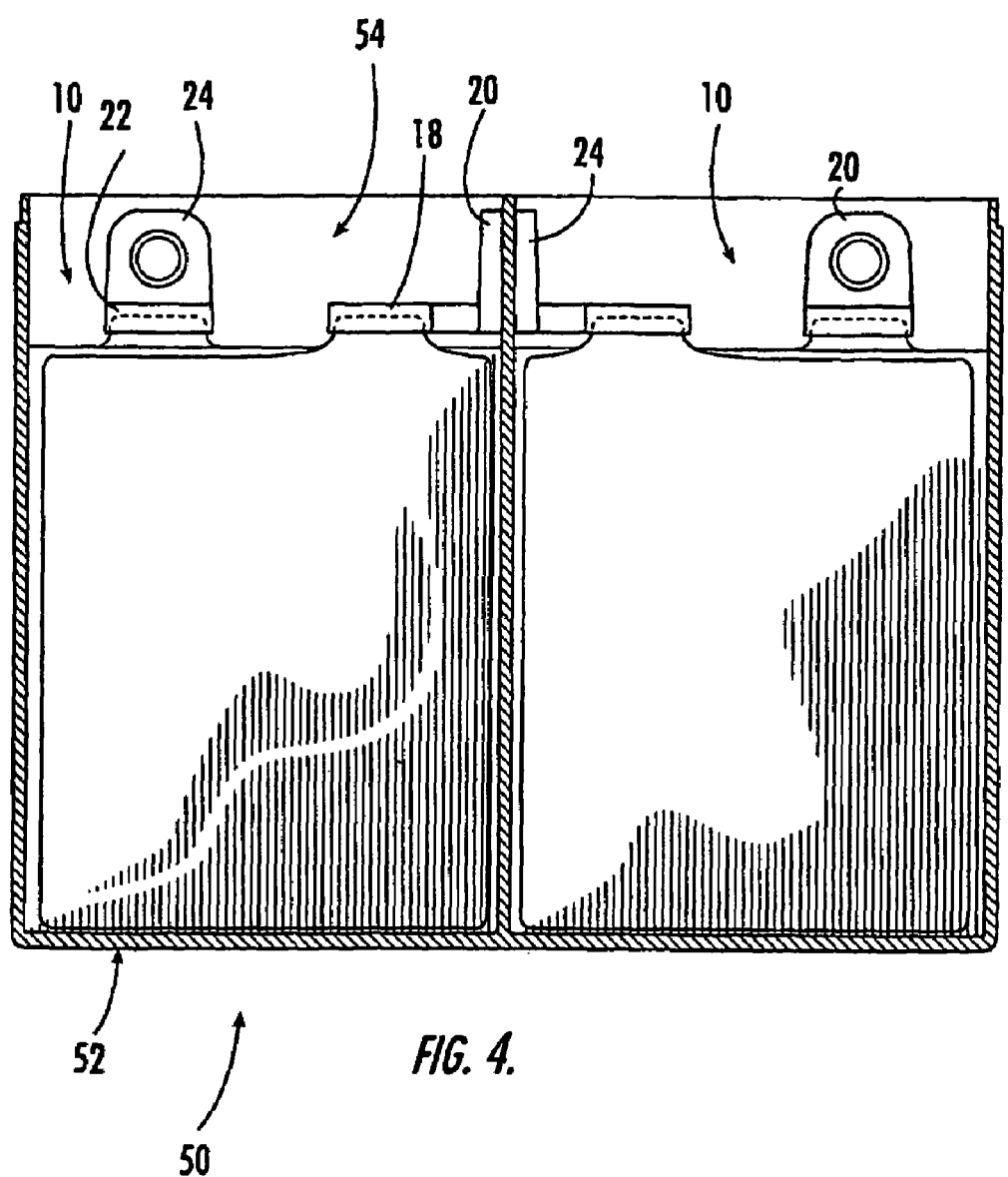
FIG. 4 is a schematic side view showing a battery of the invention containing multiple cells of FIGS. 2A and 2B.

After the straps 18, 22 have been applied to the cell 10, the cell 10 can then be positioned with additional cells 10 in a multi-cell battery 50 (see FIGS. 3 and 4). The battery 50 includes a plurality of cells 10 (typically these are similarly sized cells) and a compartmentalized housing 52, with each compartment 54 of the housing containing one cell 10 inserted therein. The cells 10 are positioned with the positive terminal 20 of one cell 10 being adjacent to the negative terminal 24 of another cell 10.

Figure 5:
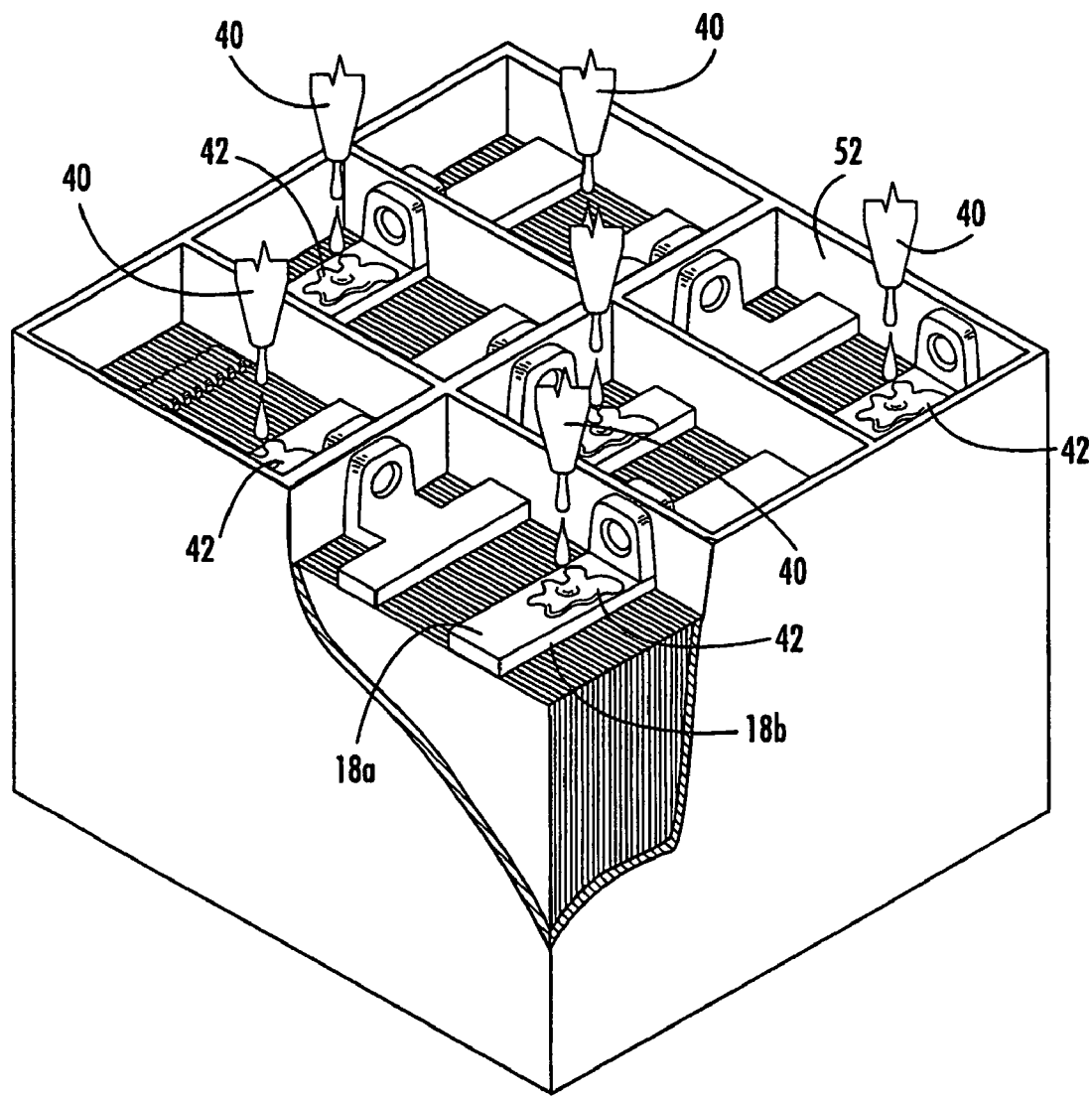
FIG. 5 is a schematic perspective view of a battery of FIG. 4 with each of its cells receiving a cap according to embodiments of the invention.
Figure 6:
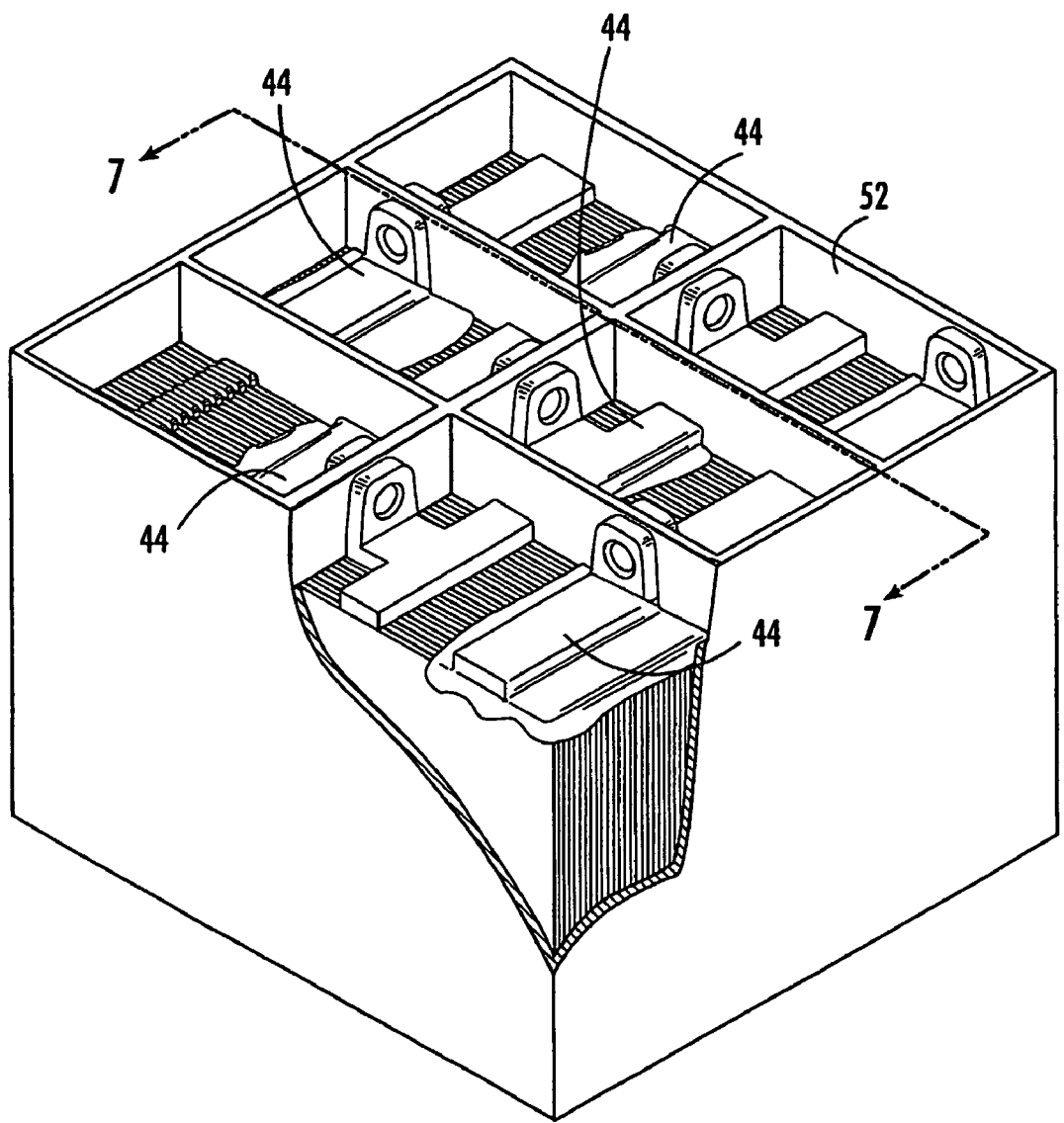
FIG. 6 is a perspective view of the battery of FIG. 5 with completed cap layers.
Figure 7:
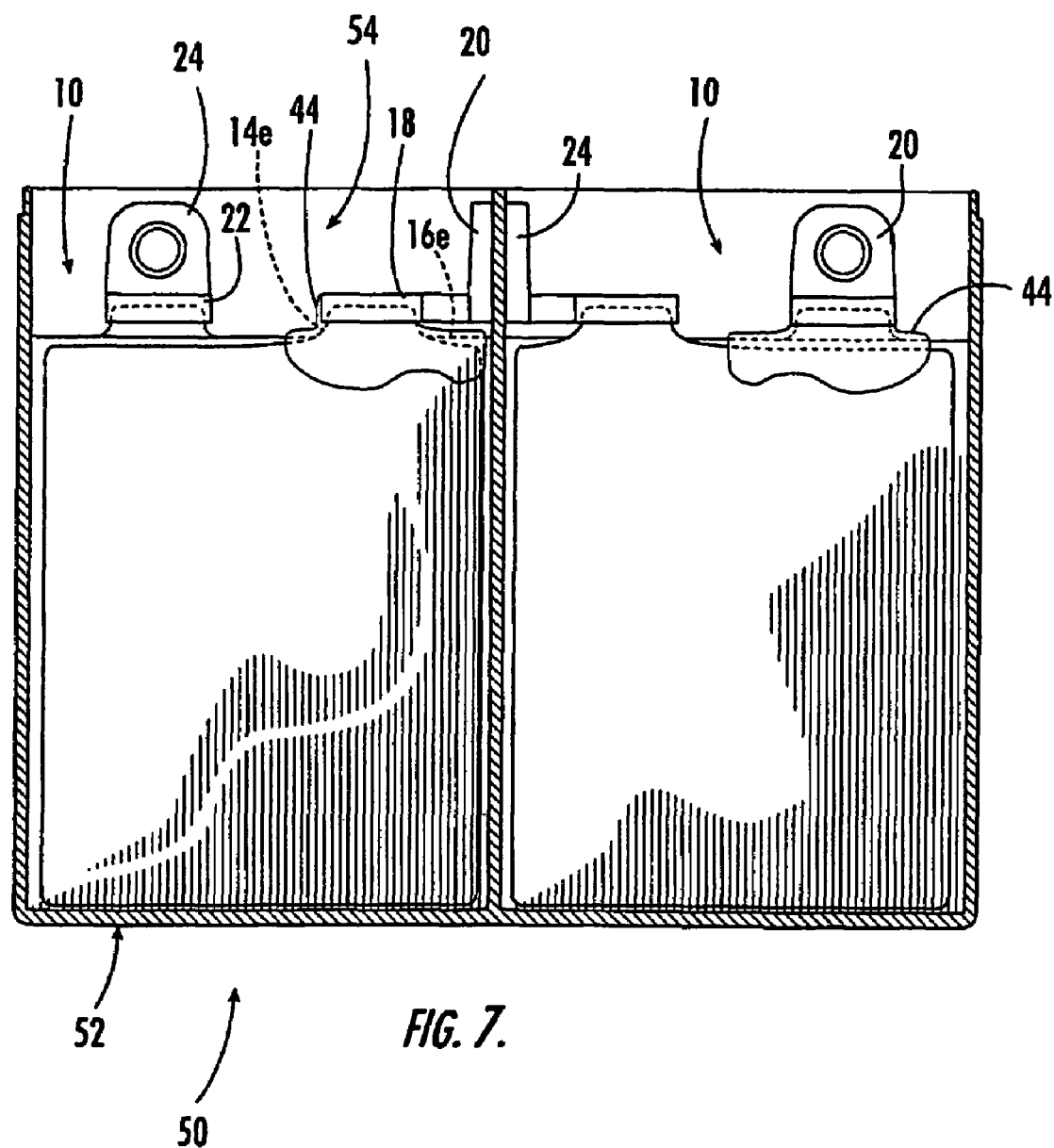
FIG. 7 is a schematic side view of a battery of FIG. 6 illustrating the cap layers.

Referring now to FIG. 5, after the cells 10 have been inserted into the housing 52, a cap material 42 (typically an adhesive) is applied to the positive connecting strap 18 of each cell 10 (the negative electrode plates 14 do not ordinarily oxidize, so the aforementioned embrittlement and cracking does not tend to occur there). The cap material 42 can be applied, for example, with a dispenser 40 that deposits the cap material 42 on an upper surface 18a of the positive connecting strap 18. The cap material 42 spreads over the upper surface 18a and drips down the sides 18b of the positive connecting strap 18 to cover exposed portions of the tabs 12a and the adjacent upper portions 12e, 14e, 16e of the positive and negative electrode plates 12, 14 and the separators 16 (see FIG. 7). The cap material 42 typically oozes into the spaces between the positive and negative electrode plates 12, 14 and the separators 16 a distance of 0.5 cm to 1.0 cm (dimensions can vary depending on battery type/size) from the upper portions 12e, 14e, 16e of the positive and negative electrode plates 12, 14 and the separators 16, but the cap material 42 may be permitted to ooze over more or less of these components as desired. The cap material 42 then hardens to form a cap 44.

In some embodiments, the cap 44 can unify the positive connecting strap 18 with the top edges of the positive and negative electrode plates 12, 14 and the separators 16, thereby providing a rigidifying structure that can improve the structural integrity and vibration resistance of the cell 10. In some other embodiments, the cap 44 can coat, inter alia, the tabs 12a of the positive electrode plates 12 and provide a protective layer against oxidation of the tabs. In still further embodiments, the cap 44 can provide structural integrity, vibration resistance and protection against oxidation.

The cap 44 may be formed of any material that can provide the aforementioned rigidifying and/or protective functions. Exemplary cap materials include adhesives, such as epoxies, reactive acrylics or jointing compounds. In some embodiments, the cap 44 may be formed of a material that has a viscosity (typically about 19 centipoise at 25 degrees C.) that enables it, as illustrated, to be deposited on the positive connecting strap 18 and spread therefrom to the upper portions 12e, 14e of the positive and negative electrode plates 12, 14 and portions of the tabs 12a, 14a. The cap material may also be resistant to acid (particularly sulfuric acid, as it is typically employed in the electrolyte solution of lead-acid batteries) and to temperatures up to 80° C. to withstand the internal environment of a battery. Further, the cap material may not significantly "out-gas" in order to avoid the generation of internal pressure within the battery, and should adhere to at least the positive electrode plates 12. An exemplary cap material is S-2470-E epoxy, available from Structural Adhesives Ltd, Bushby Brooks Works, 16 Spence Street, Leicester. LE5 3NW, United Kingdom.

Those skilled in this art will recognize that other techniques of applying the cap 44 to the positive connecting strap 18 and the upper portions 12e of the positive electrode plates 12 may be employed. For example, the cap 44 may be applied by spraying or directly injecting the material onto the upper portions 12e of the positive electrode plates 12 and tabs 12a. As another example, the cap 44 may be applied as a mold is positioned around the positive connecting strap 18 so that the cap material 42 flows to fill the mold and take a predetermined shape.

After the application of the cap layer 44, the positive and negative terminals 20, 24 of adjacent cells 10 are electrically connected. The battery 50 is then covered and filled with electrolyte solution. The filled battery is vented and capped prior to use.

Those skilled in this art will recognize that, although the cap illustrated and discussed herein is employed with a multi-cell battery, the cap may also be employed with a single cell battery. Further, although a "parallel plate" battery is illustrated and described herein, a cap may also be employed advantageously with a "spirally wound" battery, in which the positive and negative electrode plates are spirally wound in overlying fashion. Moreover, a cap may also be included on the negative connecting strap and adjacent top edges of electrode plates and separators, but need not be.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of manufacturing a battery, comprising:

providing a cell for a battery having alternating positive and negative electrode plates, each of the positive and negative electrode plates being separated by an electrically insulative separator layer, the positive and negative electrode plates being in overlying relationship, wherein each of the positive electrode plates includes a projecting tab extending from an adjacent upper portion thereof, the projecting tabs of the positive plates being generally aligned, and wherein each of the negative electrode plates includes a projecting tab, the projecting tabs of the negative plates being generally aligned;

attaching a conductive connecting strap to the projecting tabs of the positive electrode plates;

applying a cap material to portions of the projecting tabs and the adjacent upper portions of the positive plates; and allowing the cap material to harden to provide a cap attached to the projecting tabs and the adjacent upper portions of the positive plates.

2. The method defined in claim 1, wherein the cap coats and prevents oxidation of portions of the projecting tabs and the adjacent upper portions of the positive electrode plates.

3. The method defined in claim 1, wherein the cap is a rigidifying structure unifying the connection strap and the positive electrode plates.

4. The method defined in claim 1, wherein the positive and negative electrode plates are formed of lead-based materials.

5. The method defined in claim 1, further comprising inserting the cell in a housing after the attaching step.

6. The method defined in claim 1, further comprising the step of adding electrolytic solution to the cell after the applying step.

7. The method defined in claim 1, wherein the applying step comprises applying the cap material to an upper surface of the connecting strap and allowing the cap material to spread and drip to the exposed portions of the projecting tabs and the adjacent upper portions of the positive plates.

8. The method defined in claim 7, wherein the cap material comprises an adhesive resin.

9. The method defined in claim 8, wherein the adhesive resin is an epoxy resin.

10. The method defined in claim 7, wherein the cap material has a viscosity of about 19 poises at 25 degrees C.

11. The method defined in claim 1, wherein the positive and negative electrode plates are substantially planar.

12. The method defined in claim 1, wherein attaching the connecting strap comprises dipping the projecting tabs of the positive electrode plates in a conductive molten solution captured in a mold, and allowing the molten solution to freeze into a connecting strap within which the projecting tabs are embedded.

13. The method defined in claim 12, wherein the conductive molten solution comprises lead-based material.

14. A battery, comprising:
a housing;
a plurality of alternating positive and negative electrode plates, each of the positive and negative electrode plates being separated by an electrically insulative separator layer, the positive and negative electrode plates being in overlying relationship and positioned in the housing, wherein each of the positive electrode plates includes a projecting tab extending from an adjacent upper portion thereof, the projecting tabs of the positive plates being generally aligned, and wherein each of the negative electrode plates includes a projecting tab, the projecting tabs of the negative plates being generally aligned;
a conductive connecting strap attached to the projecting tabs of the positive plates;
a conductive connecting strap attached to the projecting tabs of the negative plates; and
a cap covering portions of the projecting tabs and adjacent upper portions of the positive plates.

15. The battery defined in claim 14, wherein the cap comprises an adhesive resin.

16. The battery defined in claim 15, wherein the adhesive resin comprises a material selected from the group consists of: epoxies, reactive acrylics and jointing compounds.

17. The battery defined in claim 1, wherein the positive electrode plates and the negative electrode plates are formed of lead-based materials.

18. The battery defined in claim 1, wherein the projecting tabs and adjacent upper portions of the negative electrode plates are void of a cap.

19. The battery defined in claim 1, further comprising an electrolyte solution contained in the housing.

* * * * *